United States Patent
Daily et al.

(10) Patent No.: US 8,219,512 B2
(45) Date of Patent: Jul. 10, 2012

(54) HIGHER ORDER LOGIC APPLIED TO EXPERT SYSTEMS FOR ALARM ANALYSIS, FILTERING, CORRELATION AND ROOT CAUSES WHICH CONVERTS A SPECIFICATION PROOF INTO A PROGRAM LANGUAGE

(75) Inventors: Daniel J. Daily, Westminster, CO (US); Christopher R. Gentle, Gladesville (AU); Lisa Y. Kawahara, Colorado Springs, CO (US); Ashis Maity, Arvada, CO (US); Michael J. Thomas, Denver, CO (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/212,946

(22) Filed: Aug. 18, 2011

(65) Prior Publication Data

US 2011/0302562 A1 Dec. 8, 2011

Related U.S. Application Data

(62) Division of application No. 11/962,799, filed on Dec. 21, 2007, now Pat. No. 8,027,946.

(60) Provisional application No. 60/871,673, filed on Dec. 22, 2006.

(51) Int. Cl.
*G06F 17/00* (2006.01)
(52) U.S. Cl. ........................................................ 706/45
(58) Field of Classification Search .................... 706/20, 706/45–47, 55–59
See application file for complete search history.

(56) References Cited

U.S. PATENT DOCUMENTS

| | | | |
|---|---|---|---|
| 4,972,453 A | 11/1990 | Daniel et al. | |
| 5,161,158 A | 11/1992 | Chakravarty et al. | |
| 5,276,776 A | 1/1994 | Grady et al. | |
| 5,542,024 A | 7/1996 | Balint et al. | |
| 5,546,507 A | 8/1996 | Staub | |
| 5,678,039 A | 10/1997 | Hinks et al. | |
| 5,720,008 A | 2/1998 | McGuinness et al. | |
| 5,805,808 A | 9/1998 | Hasani et al. | |
| 5,809,212 A | 9/1998 | Shasha | |
| 5,812,851 A | 9/1998 | Levy et al. | |
| 5,845,283 A | 12/1998 | Williams et al. | |
| 5,974,405 A | 10/1999 | McGuinness et al. | |
| 6,040,789 A | 3/2000 | Nishida et al. | |
| 6,327,587 B1 | 12/2001 | Forster et al. | |
| 6,374,261 B1 | 4/2002 | Alvarez et al. | |
| 6,408,350 B1 | 6/2002 | Kawamura et al. | |
| 6,490,371 B1 | 12/2002 | Aoki et al. | |

(Continued)

FOREIGN PATENT DOCUMENTS

WO   WO 98/14017   4/1998

(Continued)

OTHER PUBLICATIONS

Frohlich et al., Using Extended Logic Programming for Alarm-Correlation in Cellular Phone Networks, 2002, pp. 1-12.*

(Continued)

*Primary Examiner* — David Vincent
(74) *Attorney, Agent, or Firm* — Sheridan Ross P.C.

(57) ABSTRACT

The present invention is directed to a system and method for applying second- and higher-order logic to analysis of event descriptive information, such as alarms, error messages, and fault signals.

14 Claims, 4 Drawing Sheets

U.S. PATENT DOCUMENTS

| | | | |
|---|---|---|---|
| 6,523,172 | B1 | 2/2003 | Martinez-Guerra et al. |
| 6,549,918 | B1 | 4/2003 | Probert, Jr. et al. |
| 6,601,058 | B2 | 7/2003 | Forster et al. |
| 6,807,585 | B2 | 10/2004 | Kovacevic |
| 6,886,166 | B2 | 4/2005 | Harrison et al. |
| 7,035,335 | B1 | 4/2006 | Iacobelli et al. |
| 7,093,292 | B1 | 8/2006 | Pantuso |
| 7,187,694 | B1 | 3/2007 | Liao |
| 7,233,597 | B2 | 6/2007 | Kumar et al. |
| 7,337,314 | B2 | 2/2008 | Hussain et al. |
| 7,366,961 | B1 | 4/2008 | Kovacevic et al. |
| 7,391,735 | B2 | 6/2008 | Johnson |
| 7,434,225 | B2 | 10/2008 | Groetzner et al. |
| 7,463,630 | B2 | 12/2008 | Lee |
| 7,551,575 | B1 | 6/2009 | Aleksandrowicz |
| 7,657,933 | B2 | 2/2010 | Hussain et al. |
| 7,661,130 | B2 | 2/2010 | Hussain et al. |
| 7,680,037 | B2 | 3/2010 | Cortes et al. |
| 7,724,740 | B1 | 5/2010 | Wang et al. |
| 7,873,992 | B1 | 1/2011 | Daily et al. |
| 8,027,946 | B1 | 9/2011 | Daily et al. |
| 2003/0222977 | A1 | 12/2003 | Yoshino |
| 2004/0010780 | A1 | 1/2004 | Garvin |
| 2004/0042470 | A1 | 3/2004 | Cooper et al. |
| 2005/0004942 | A1 | 1/2005 | Madsen et al. |
| 2005/0278340 | A1 | 12/2005 | Rehberg et al. |

FOREIGN PATENT DOCUMENTS

| | | |
|---|---|---|
| WO | WO 03/052688 | 6/2003 |

OTHER PUBLICATIONS

Berghofer, Program extraction in Isabelle, Oct. 2, 2006, Wayack Machine, pp. 1-27.*

Wayback Machine of website that had Berghofer paper, printed Nov. 12, 2011.*

"Automatic E-Mail Distributors," Computer Telephony, Nov. 1998, vol. 6(11), pp. 143-144.

"Descriptive complexity," Wikipedia, available at http://en.wikipedia.org/wiki/Descriptive_complexity, printed Nov. 1, 2007, pp. 1-2.

"Dynamic logic (modal logic)," Wikipedia, available at http://en.wikipedia.org/wiki/Dynamic_logic_%28modal_logic%29, printed Nov. 1, 2007, pp. 1-9.

"Expert system," Wikipedia, available at http://en.wikipedia.org/wiki/Expert_system, printed Nov. 1, 2007, pp. 1-13.

"First-order logic," Wikipedia, available at http://en.wikipedia.org/wiki/First-order_logic, printed Nov. 1, 2007, pp. 1-18.

"Fuzzy logic," Wikipedia, available at http://en.wikipedia.org/wiki/Fuzzy_logic, printed Nov. 1, 2007, pp. 1-11.

"Higher-order logic," Wikipedia, available at http://en.wikipedia.org/wiki/Higher-order_logic, printed Nov. 1, 2007, pp. 1-2.

"Index of Isabelle/HOL," available at http://isabelle.in.tum.de/library/HOL/index.html, Oct. 2005, 2 pages.

"Isabelle/HOL-Higher-Order Logic," Institut fur Informatik TU Munchen, (2005), 430 pages.

"Logic," Wikipedia, available at http://en.wikipedia.org/wiki/Logic, printed Nov. 1, 2007, pp. 1-13.

"Mathematical logic," Wikipedia, available at http://en.wikipedia.org/wiki/Mathematical_logic, printed Nov. 1, 2007, pp. 1-5.

"Non-Monotonic Logic," Stanford Encyclopedia of Philosophy, available at http://plato.stanford.edu/entries/logic-nonmonotonic/, printed May 1, 2006, pp. 1-14.

"Predicate logic," Wikipedia, available at http://en.wikipedia.org/wiki/Predicate_logic, printed Nov. 1, 2007, 1 page.

"Second-order arithmetic," Wikipedia, available at http://en.wikipedia.org/wiki/Second-order_arithmetic, printed Nov. 1, 2007, pp. 1-8.

"Second-order logic," Wikipedia, available at http://en.wikipedia.org/wiki/Second-order_logic, printed Nov. 1, 2007, pp. 1-8.

"Semantics of logic," Wikipedia, available at http://en.wikipedia.org/wiki/Semantics_of_logic, printed Nov. 1, 2007, pp. 1-2.

"What is Isabelle?," available at http://www.cl.cam.ac.uk/Research/HVG/Isabelle/, University of Cambridge Computer Library, updated Apr. 29, 2005, pp. 1-3.

Allport et al., "Teaching the Computer to Understand," IEEE/IEE, 1988 pp. 8/1-8/2.

Bacon, "Leadership through Influence," Lore International Institute, 1994, pp. 1-161.

Barkai, "Automatic Generation of a Diagnostic Expert System from Failure Mode and Effects Analysis (FMEA) Information," available at http://www.fmeainfocentre.com/download/SAE99.pdf, International Congress and Exposition, Detroit Michigan, Mar. 1-4, 1999, pp. 1-6.

Benzmuller et al., "Can a Higher-Order and a First-Order Theorem Prover Cooperate?," Springer-Verlag, available at http://www.cs.bham.ac.uk/~mmk/papers/05-LPAR.html, 2005, pp. 1-21.

Berghofer, "Proofs, Programs and Executable Specifications in Higher Order Logic," available at http://deposit.ddb.de/cgi-bin/dokserv?idn=969627661&dok_var=d1&dok_ext=pdf&filename=969627661.pdf, Jun. 18, 2003, 175 pages.

Briggs et al., "Myers-Briggs Type Indicator," Consulting Psychologists Press, Inc., 1990, 7 pages.

Brucker et al., "HOL-TestGen 1.0.0 User Guide," Information Security, ETH Technical Report 482, Apr. 2005, pp. 1-50.

Chander et al., "Using Goals to Design and Verify Rule Bases," Decision Support Systems, 1997, vol. 21, pp. 281-305.

Chander, P. G., "On the Design and Evaluation of Rule-Based Systems," Ph.D. thesis, Department of Computer Science, Concordia University, Montreal, Quebec, Canada, Jun. 1996, 179 pages.

DeBenham, "A Structure for Expert Systems Maintenance," Expert Systems with Applications, 1996, vol. 11, No. 4, pp. 553-559.

DeBenham, J., "Expert Systems Designed for Maintenance," Expert Systems with Applications, 1992, vol. 5, pp. 233-244.

Gupta, U., "Validation and Verification of Knowledge-Based Systems: A Survey," Journal of Applied Intelligence, 1993, vol. 3, No. 4, pp. 343-363.

Hamburger et al., "A Decentralized AI System for Transcript Applications," IEEE, 1990, pp. 48-53.

Hurd et al., "Probablistic Guarded Commands Mechanized in HOL," Theoretical Computer Science, 2005, vol. 346, pp. 96-112.

Kummerow et al., "Interpretive Guide for the MBTI Expanded Analysis Report," Consulting Psychologists Press, Inc., 1992, 73 pages.

Myers et al., "MBTI Manual A Guide to the Development and Use of the Myers-Briggs Type Indicator," Consulting Psycologists Press, Inc., 1998, 441 pages.

Nipkow et al., "Isabelle/HOL: A Proof Assistant for Higher-Order," published by Springer-Verlag, Feb. 26, 2002, 231 pages.

Preece, A., "A New Approach to Detecting Missing Knowledge in Expert System Rule Bases," International Journal of Man Machine Studies, 1993, vol. 38, No. 4, pp. 661-688.

Schmidt, "Denotational Semantics—A Methodology for Language Development," Allyn and Bacon, Inc., 1986, 344 pages.

Tan, M., "Telecommunications," The Handbook of Applied Expert Systems, Edited by Jay Liebowitz, CRC Press, 1997, pp. 24-1-24-12.

Yang et al., "Nemos: A Framework for Axiomatic and Executable Specifications of Memory Consistency Models," International Parallel and Distributed Processing Symposium, 2004, pp. 1-15.

Zhang et al., "A Novel Architecture for an Integrated Fault Diagnostic/Prognostic System," AAAI Technical Report SS-02-03, Spring 2002, 9 pages.

Official Action for U.S. Appl. No. 11/962,799, mailed Sep. 27, 2010.

Official Action for U.S. Appl. No. 11/962,799, mailed Jan. 31, 2011.

Notice of Allowance for U.S. Appl. No. 11/962,799, mailed May 19, 2011.

Background of the Invention for the above captioned application filed Aug. 18, 2011 (previously provided).

"Avaya EXPERT Systems Diagnostic Tools-24/7/365: Monitoring, Diagnostics and Resolution," Avaya Global Services, 2003, 4 pages.

"ML (programming language)," Wikipedia, Oct. 17, 2007, 4 pages, at http://en.wikipedia.org/wiki/ML_%28programming_language%29.

"Quantifying the Value of Remote Maintenance: An Anyalysis of Customer Outage Data," White Paper, Avaya, 2006, 10 pages.

* cited by examiner

HIGHER ORDER LOGIC APPLIED TO EXPERT SYSTEMS FOR ALARM ANALYSIS, FILTERING, CORRELATION AND ROOT CAUSES WHICH CONVERTS A SPECIFICATION PROOF INTO A PROGRAM LANGUAGE

CROSS REFERENCE TO RELATED APPLICATIONS

The present application is a division of U.S. patent application Ser. No. 11/962,799, filed Dec. 21, 2007, which claims the benefit of U.S. Provisional Application Ser. No. 60/871,673, filed Dec. 22, 2006, the entirety of which are hereby incorporated herein by reference.

FIELD OF THE INVENTION

The invention relates generally to intelligent systems and particularly to the application of higher order logic to systems for analyzing behavior.

BACKGROUND OF THE INVENTION

In the technologically centered society of today, intelligent and non-intelligent components have wide application. In communications, for example, network elements, such as routers, firewalls, servers, switches, gateways, and text and voice communication devices are indispensable. The behavior of these components can be analyzed and modeled not only to identify past and current behavior and root causes thereof but also to predict future behavior.

Monitoring and/or analyzing Service Oriented Architectures (SOA) are common applications for behavior analysis and modelling systems. SOA is not necessarily an architecture but rather a framework that may contain an arbitrary number of architectures. Such monitoring and analyzing systems that are used not only to implement but also to evaluate SOA and the solutions SOAs contain. For example, behavioral analysis and modeling systems are used as expert systems to analyze, correlate, and filter alarms from a converged data environment composed of diverse network elements.

There are many providers of commercial and open source expert systems, expert system development shells, and rule-based logic for SOA applications. Some languages, such as variants of Prolog, have limited extensions (or extensions with limited generality can be written in Prolog itself) that support aspects of second-order logic that in turn support sets of sets or searching sets based on properties. However, Prolog lacks important features needed by and common to expert systems, such as generating explanations and performing uncertainty reasoning.

JRules by ILOG supports rules about rules, which are a second-order feature, but it is not a full implementation of higher-order logic. The lack of a full implementation means that the advantages of descriptive programming, namely, allowing the rule set to generate the behavior by expressing what needs to be done rather than having to program how it is to be done—may not be fully available.

The EMC SMARTS tool provides alarm and event correlation and root cause analysis, but it is not rule-based. It uses a semi-ring representation that supports deterministic, fuzzy logic, temporal and probabilistic modeling of alarming and events. A semi-ring is an algebraic structure, similar to a ring, but it does not have additive inverses. A ring is an algebraic structure for which addition and multiplication are defined. Although EMC claims that its tool is faster than rule-based systems, it does not have the flexibility and generality of rule-based systems.

Second-order and higher-order programming is used in imperative programming—but it is not widely recognized as such. The LISP lambda calculus has used this approach for decades, but it is more procedural programming than logic-based.

Pointers to functions in the C language and virtual functions in C++ are second-order constructs that are place holders for other functions, and the Aspect programming language allows programming statements about JAVA program syntax and even the Aspect language itself. However, logic programmers have been slow to adopt such abstractions, largely for performance reasons.

Largely because the first order predicate logic expressions that are used to implement them have syntactic limitations, current implementations of expert systems tend to be monolithic and limited to "one-size-fits-all-customers." Such systems are generally implemented in a subset of first-order logic or in temporal logic (based on modal logic) to implement time-based decision-making. The syntactic limitations can make first-order logic cumbersome to use because it requires verbosity that is difficult to maintain, or it is impossible to effectively parameterize and encode unifying and generalizing abstractions across diverse network elements.

There are also semantic limitations imposed by compromises made in the design of the implementation of first order logic that is used to construct the expert system. The semantics are limited owing to compromises made in the implementation of first order logic proof procedure design. Negation is one example taken from Prolog and JRules. Negation is not entirely implemented and does not conform to its usual usage in formal logic. Sometimes negation by failure is used, but typically even that is difficult to completely implement. Other implementations of negation limit search trees rather than fully complement sets.

A further reason that current implementations of expert systems are monolithic is that the data network topology is more easily categorized and reasoned over by using properties of individual networks and properties across networks. Current technology uses a connectivity or relationship view that is not easily abstracted to a more general property-based abstraction. A property based view is inherently second order because it refers to sets of elements. Even more powerful third order abstraction of properties of properties can be cumbersome to express.

Even if the above tools and environments completely supported first-order logic, they are still limited by Gödel's Incompleteness theorems. Gödel showed that, for any reasonably powerful formal system of axioms and inference rules capable of supporting the arithmetic of addition, multiplication, and exponentiation, there are statements that can neither be proved nor disproved based on the axioms and inference rules. A higher level of abstraction is needed to make effective and paradox-free statements about formal mathematical systems. For expert systems, a similar higher level of abstraction is needed to create effectively meta-statements about expert systems that would guide, for example, their generation for specific customers and configurations.

SUMMARY OF THE INVENTION

These and other needs are addressed by the various embodiments and configurations of the present invention. The present invention is directed to the use of second- and/or higher-order logic to analyze event descriptive information and/or create lower-logic modules to perform the analysis.

In a first embodiment, a method is provided that includes the steps:

(a) receiving, from a network element, event descriptive information, the event descriptive information describing an event involving one or more of a state, condition, configuration, operation, function, identity, type, and status of the network element; and (b) analyzing, by second-order and/or higher-order logic statements, the received event descriptive information to determine one or more of (i) an event described by the event descriptive information, (ii) a causal event underlying the event described by the event descriptive information, and (iii) a remedial action to respond to the event described by the event descriptive information.

This embodiment can overcome the problem of the pragmatics of programming languages that are used to analyze and diagnose events, such as alarm conditions, by an expert system. Pragmatics concerns usability or whether and how well a language fulfills its stated goals. This embodiment can address issues of concise and succinct syntax and incorporate deep semantics from mathematical logic. Higher-order logic has powerful pragmatics in that it can very concisely express rule sets, actions, correlations, relationships, and attributes at a very abstract level. The embodiment can address shortcomings of conventional expert system technology with respect to the cross correlation of alarms for individual products and filtering of alarms based on their sequence. Such technology takes a functional approach of splitting alarm streams (via a universal controller) and sending them to separate expert systems for analysis and remediation. This embodiment can correlate alarms from diverse combinations of products.

In a second embodiment, a system is provided that includes:

(a) an input to receive, from a network element, event descriptive information, the event descriptive information describing an event involving one or more of a state, condition, configuration, operation, function, identity, type, and status of the network element;

(b) a plurality of lower-order logic modules to analyze event descriptive information and determine one or more of (i) an event described by the event descriptive information, (ii) a causal event underlying the event described by the event descriptive information, and (iii) a remedial action to respond to the event described by the event descriptive information;

(c) a many-order logic module to select, by at least one of second-order and higher-order logic statements, a lower-order logic module to analyze selected event descriptive information; and (d) an interface to output the determined (i) event described by the event descriptive information, (ii) causal event underlying the event described by the event descriptive information, and/or (iii) remedial action.

In a third embodiment, a method is provided to create an expert system to process event descriptive information. The method includes the steps:

(a) providing a specification proof describing one or more of (i) a state and/or configuration and (ii) a condition, operation, and function of the network element;

(b) converting, by a program extractor, one or more of the specification proof and a modified form thereof into a first program language; and (c) converting, by a code generator, the first program language into a second program language, the second program language describing an expert system operable to analyze event descriptive information.

This embodiment can provide a flexible framework for automatically generating and custom tailoring expert systems to individual customers, services, national requirements, and products and their unique network topologies regarding both equipment and grouping (such as in branch offices). It can address the challenges created by core services by providing a succinct way to create a higher level of abstraction for attributes (or meta-attributes) that span seemingly disparate types of products. Although the use of higher-order logic in commercial systems has been avoided due to perceived performance problems, using second- and/or higher-order logic to create first-order and lower expert systems can overcome these perceived performance issues. Second- and higher-order logic programs, unlike first-order logic programs, are not guaranteed to terminate. First-order logic programs are also generally more computationally efficient than second- and higher-order logic programs.

The present invention can provide a number of other advantages depending on the particular configuration. Depending on the configuration, the invention can provide one or more of the following: a layer of abstraction (of arbitrary depth) above individual expert systems that parameterize their logical statements so that changes to the abstraction layer are propagated easily to the expert systems themselves, a meta-expert system through which other expert systems may be generated, a concise representation of important logical concepts relevant to a family of expert systems, a dynamic reconfiguration of the expert systems at run time (thereby allowing them to adapt to evolving conditions), a concise representation and application of higher-order logical concepts to LAN/WAN diagnosis, and a property-based view of unlimited generality for reasoning over, among other things, data network topologies.

These and other advantages will be apparent from the disclosure of the invention(s) contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine," "calculate," "compute" and variations thereof, as used herein, are used interchangeably and include any type of methodology, process, mathematical operation, or technique.

The term "expert system" or knowledge-based system is a computational module that contains some of the subject-specific knowledge and contains the knowledge and analytical skills of one or more human experts.

The term "first order logic" (FOL) is a formal deductive system also known as first-order predicate calculus, lower predicate calculus, the language of first-order logic, or predicate logic. First order logic uses a wholly unambiguous formal language interpreted by mathematical structures. First order logic is a system of deduction extending propositional logic by allowing quantification over individuals of a given domain (universe) of discourse. A first-order theory consists of a set of axioms (usually finite or recursively enumerable) and the statements deducible from them given the underlying deducibility relation. First-order theory typically is a set of axioms together with a complete (and sound) axiomatization FOL. FOL with equality typically does not include or permit defining an if-then-else predicate or function if(c,a,b), where "c" is a condition expressed as a formula while a and b are either both terms or both formulas and its result would be "a" if c is true and "b" if it is false.

The term "formal logic" is the study of inference with purely formal content, where that content is made explicit. An inference possesses a purely formal content if it can be expressed as a particular application of a wholly abstract rule, that is, a rule that is not about any particular thing or property.

The term "higher-order logic" is distinguished from first-order logic in a number of ways. One way is the type of variables appearing in quantifications. In first-order logic, it is forbidden to quantify over predicates. A second way is in the constructions allowed in the underlying type theory. A higher-order predicate is a predicate that takes one or more other predicates as arguments. Generally, a higher-order predicate of order n takes one or more (n−1)th-order predicates as arguments, where n>1. Higher-order logic allows quantification over higher predicate types than first-order logic permits. These higher predicate types include relations between relations, functions from relations to relations between relations, etc.

The term many-order logic refers to logical frameworks having a higher order than first-order logic. Many-order logic, for example, includes second-order logic and higher-order logic.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The term "predicate logic" allows expressions to be analyzed into subject and argument in several different ways, thereby potentially solving problems of multiple generality. In mathematics, predicate logic is the generic term for symbolic formal systems like first-order logic, second-order logic, many-sorted logic, or infinitary logic.

The term "proof theory" is the study of formal proofs, expressed as formal mathematical objects, in various logical deduction systems.

The term "proof theoretic semantics" associates the meaning of propositions with the roles that they can play in inferences.

The term "second-order logic" extends first-order logic and uses the idea of domain of discourse. The domain is a set of individual elements, which can be quantified over. First-order logic includes only variables and quantifiers that range over individual elements of the domain. Second-order logic extends first-order logic by adding variables and quantifiers that range over sets of individuals. For example, the syntax of second-order logic includes the syntax of first-order logic and other sorts or types of variables, such as a sort of variables that range over sets of individuals. For each natural number k there is a sort of variable that ranges over all k-ary relations on the individuals, and for each natural number k, there is a sort of variable that ranges over functions that take k, elements of the domain and return a single element of the domain. The semantics of second-order logic include the standard semantics of first-order logic, or standard semantics, and the additional semantics, called Henkin semantics. Second-order logic allows quantification over subsets and relations or over all predicates.

The term "semantics" refers to aspects of meaning, as expressed in language or other systems of signs.

The term "set theory" is the study of sets, which are abstract collections of objects. The basic concepts of set theory, such as subset and relative complement, are often called naïve set theory. Axiomatic set theory uses logical methods to study which propositions are provable in various formal theories, such as Zermelo-Fraenkel with Axiom of Choice (ZFC) or Zermelo-Fraenkel (ZF).

The term "syntax" refers to the structure of sign systems. Unlike semantics, syntax focuses on form, not meaning.

The preceding is a simplified summary of the invention to provide an understanding of some aspects of the invention. This summary is neither an extensive nor an exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The General Architecture

Figure 1:
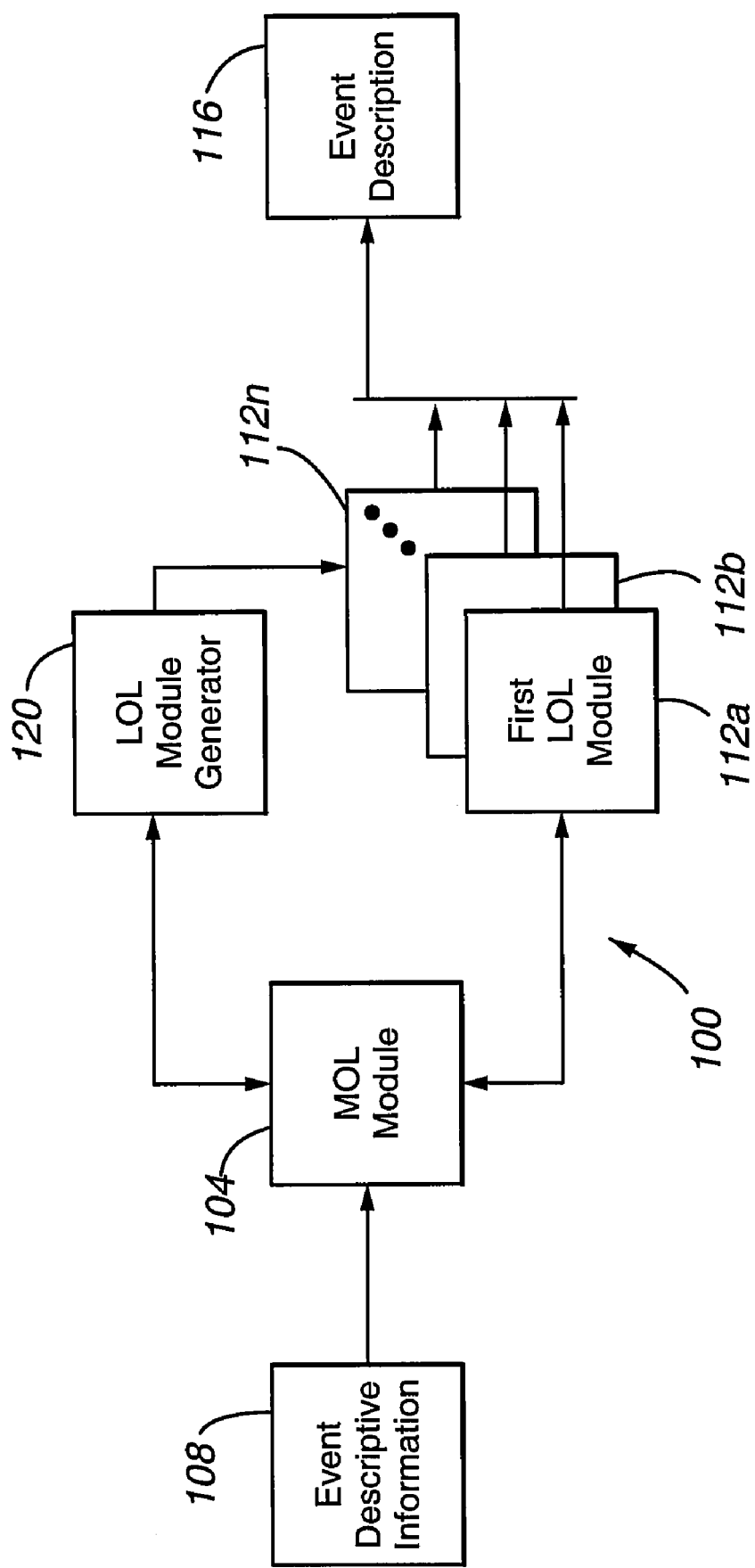
FIG. 1 is a block diagram of a behavioral analysis and identification system according to a first embodiment.

FIG. 1 depicts a behavioral analysis and identification system according to a first embodiment of the present invention. The system 100 includes the following: a Many-Order Logic (MOL) module 104 to receive and preliminarily analyze event descriptive information 108 associated with an automated entity, first, second, . . . nth Lower Order Logic (LOL) modules 112*a-n* to analyze the information 108 and describe the associated event as event description 116, and an LOL module generator 120 to create an LOL module 112 to analyze selected event descriptive information 108 associated with a selected type and/or configuration of the automated entity. Although not shown, the MOL module 104, LOL module generator 120, and first, second, ... nth LOL modules 112a-n can be employed by a common processor on a common computer or by multiple processors on multiple computers.

The event descriptive information 108 can have arbitrary symbols and/or syntactical and/or semantical structures and describes a predetermined event, which is frequently a type of behavior. Examples of events include a module state, condition, configuration, operation, activity, function, type, identity, and the like. By way of illustration, in computer networks the event descriptive information includes fault signals, alarms, alarm bursts, error messages, control signals, data signals (e.g., bearer signals), and other types of communication signals. The information 108 can be generated by the associated automated entity (which is typically a computational component or network element) or by an agent in the entity.

The MOL module 104 has a higher-than-first-order logic and controls processing of the information 108. The control operations include selecting an appropriate first, second, ... LOL module 112a-n to analyze the information 108, requesting the LOL module generator 120 to create an LOL module 112 to analyze the information 108, and notifying a (human) administrator or operator in the event that the information 108 is not able to be analyzed by the system 100. In one configuration, the MOL module 104 can use the module(s) 112 to iterate over sets of different automated entities and the predicates of the rule sets for selected subsets of automated entities.

Selection or generation of a suitable module 112 and/or the determination that the information 108 is not capable of being analyzed can be performed in many ways. For example, the MOL module 104 preliminarily analyzes the information 108 to select a rule set or LOL module 112 that appears to be capable of analyzing the information 108. In another alternative, the MOL module 104 provides the information 108, sequentially or concurrently, to selected ones of the first, second, ... nth modules 112a-n and, based upon feedback received from the modules, selects which is best able to analyze the information 108. The feedback can be, for example, an error signal or analysis results.

Each of the first, second, ... nth modules 112a-n has a lower level of logic than the MOL module 104 and corresponds to a unique rule set defining a set of events having one or more members. For example, if the module 112 is defined by first-order or lower logic the MOL module 104 is defined by second-order or higher-order logic. In another example, if the module 112 is defined by second-order logic the MOL module 104 is defined by higher-order logic. In one configuration, each module 104 corresponds to a set of events for a specific manufacturer and model of network element. For instance, each module 104 could be a respective rule set defining a respective set of events corresponding to a respective model of gateway, router, (media) server, switch (e.g., PBX), voice communication device (e.g., hard phone, softphone, etc.,), text communication device (e.g., laptop computer, personal computer) and software products of Avaya Inc. The network element is not limited to hardware. It can also be software within a hardware network element or a combination of hardware and software. For example, each module 104 could be a respective rule set defining a respective set of events corresponding to a respective type and release of software manufactured by Avaya Inc. In another configuration, each module 104 corresponds to a rule set defining a set of events for a respective set of network elements of a selected enterprise.

The LOL module generator 120 generates an LOL module 112 according to propositions or a specification proof provided by the MOL module 104. The propositions or specification proofs, for example, can describe a set of states, conditions, configurations, operations, statuses, functions, types, identities, alarms, errors, activities, and the like for a set of computational components. The propositions or specification proofs can be based, for example, upon manufacturer or programmer inputted product specifications or descriptions or upon product behavioral descriptions generated by an artificially intelligent monitor, such as a neural network. As discussed in more detail below with reference to FIG. 4, the LOL module generator 120, in one configuration, creates modules 112 using Curry-Howard isomorphism, proof theory, and/or set theory. Using these techniques, the module 112 is a program extracted from derivations of the propositions or specification proofs.

The event description 116 is a description of the predetermined event associated with the analyzed event descriptive information 108 and/or an underlying event causing the predetermined event, and/or a set of conclusions and/or recommendations based on the identified event derived from analysis of the event descriptive information. For example, the description can be of the particular state, condition, configuration, operation, function, alarm, error message, status, type, identity, and/or activity that is the subject of the analyzed event descriptive information 108.

The event description 116 can be provided to an automated diagnostic system (not shown), a human operator (e.g., in a report or by a graphical user interface display, etc.), or saved in a tangible form on a computer readable medium (not shown).

An Exemplary Architecture for the Behavioral Analysis and Identification System

This architecture encompasses alarm, error message, and fault signal analysis. This application asserts the existence of certain properties and meta-properties of alarming network elements. Determining whether elements of a list of products have a particular property (such as an error condition) is inherently a second- or higher-order statement. It refers to properties of subsets of a set. Categorizing such properties to apply them conveniently across products is a third- or higher-order (a meta-property) because it references sets of subsets.

There is not a standardized syntax for representing higher order logic statements. The notation $\exists_g g[f][x]$ asserts the existence of a function "g," where "x" is an unbounded set of product elements, "f" is an unbounded set of properties of those elements, and "g" selects those properties of interest. When a descriptive language, such as Isabelle (unlike functional languages such as Java, C++, LISP, etc.), asserts the existence of a function, within limits, it automatically instantiates and enumerates functions without requiring a programmer to define the functions.

Alternatives exist to implement in a descriptive language a layer of abstraction (of arbitrary depth) above individual expert systems that parameterize the expert systems' logical statements so that changes to the abstraction layer are propagated easily to the expert systems themselves. A simple example is how the concept of equality can be generalized and applied. Equality is a second-order theorem that is inexpressible in first-order logic. This is why many foundational proofs begin with the assumptions of first-order predicate calculus and add "with equality."

Equality is second-order because it is a statement about first-order predicates, e.g.

$$\forall P. x=y \Leftrightarrow P(x)=P(y)$$

In this statement, "P" is actually a bounded variable that takes on the value of predicates. In first-order logic, "P" cannot be a variable, instead it must be a specific predicate, e.g., X>0.

The above expression roughly means that, for all first-order predicates, P, two free elements, namely x and y, are equal, if and only if they both have or lack the same properties. Hence, through second-order logic it is possible to define the notion of equality by defining P∈P, where "P" is a set of predicates. This allows differential and independent definition of what is equal or comparable in expert systems that lie at a lower layer of abstraction, so that the same rule sets may apply to the objects associated with different products.

The following is a discussion of how second-order logic can implement a meta-expert system through which other expert systems may be generated; a concise representation of important logical concepts relevant to a family of expert systems; and a dynamic reconfiguration of the expert systems at run time (thereby allowing them to adapt to evolving conditions). In first-order logic, one can assert that two individuals share a certain property, e.g., $P(x) \wedge P(y)$. But in second-order logic the assertion that every two individuals share some property can be expressed as:

$$\forall x \forall y \exists P (P(x) \wedge P(y))$$

Second-order statements may be used as templates to instantiate first-order statements, such as $P(x) \wedge P(y)$. These second-order statements can be compiled by current expert system shells to implement a meta-expert system through which other expert systems may be generated. Alternatively, the second-order expression itself can be applied across an arbitrary number of expert systems to implement a concise representation of important logical concepts relevant to a family of expert systems. In a further alternative, expressions can be created dynamically at run time, loaded, and evaluated to implement a dynamic reconfiguration of the expert systems at run time.

A concise representation of important logical concepts relevant to a family of expert systems can also provide a concise representation through generalized quantifiers, which refer to properties of properties. The meanings of the symbols ∀ and ∃ can be extended to apply iteration over specific numbers, such as a dozen or half-dozen, even/odd occurrences, or elements with particular properties of interest. The symbols [[ ]] are sometimes used to denote generalized quantification, which is usually shortened to just quantification. Hence, the expression "or all Avaya Inc., products" could be expressed as

[[AVAYA Products]].

An example of how higher-order logic might be used to implement a dynamic reconfiguration of the expert systems at run time (thereby allowing them to adapt to evolving conditions) is now discussed. A common problem with networks is flapping, both among network elements, among software layers within an individual network element, and regarding the operations of individual elements (e.g., route flapping, whereby a router advertises a destination via one route and then another). An abstract form of mathematical induction could be applied to recognizing flapping sequences of arbitrary network element types, contexts, and depths. Other rules of inference, such as proof by cases, transitivity, excluded middle, etc., may also be similarly generalizable.

Mathematical induction itself is a second-order proof method. It is used to establish that a statement is true of all natural numbers or, more generally, some infinite sequence. More formally:

$$\forall M \cdot 0 \in M \wedge \forall x \cdot (x \in M \Rightarrow x+1 \in M) \Rightarrow x \cdot (x \in M)$$

Informally, this equation shows that M ranges over sets of integers rather than being simply a set of integers. In particular, the equation shows that M contains a basis (0–some starting point) and that, if some element x is an element of M, it implies that its successor is also an element of M, and then M is an inductive set.

Mathematical induction can be generalized to flapping, as follows:

$$\forall M \cdot e \in M \wedge \forall x \cdot (x \in M \Rightarrow s(x) \in M) \Rightarrow \forall x \cdot (x \in M)$$

where e is a basis (roughly some starting point), and s(x) is some way to select a successor of x, and may be selected arbitrarily for a particular application. The point is that generalization of induction as a template for flapping may be applied to all elements for which a basis and successor function can be defined.

A simple example of how higher-order logic can be used to implement a property-based view of unlimited generality for reasoning over, among other things, data network topologies is now discussed. Data networks tend to evolve over time. As start-up companies grow in size, their initial single router networks tend to be piggybacked with new routers. Over time, their network tends to become somewhat linear with resulting performance problems as packets originating and terminating at endpoints need to traverse all routers. Various networks with differing connectivity can be classified as having various linear-like properties when those networks are known to approximate the failings of a linear network. Those linear-like properties can then be aggregated under a meta-property of linear-like-failure, which then allows a higher-order expert system to use this third-order predicate to trigger rules that are generalized across multiple networks with different seeming configurations.

Figure 2:
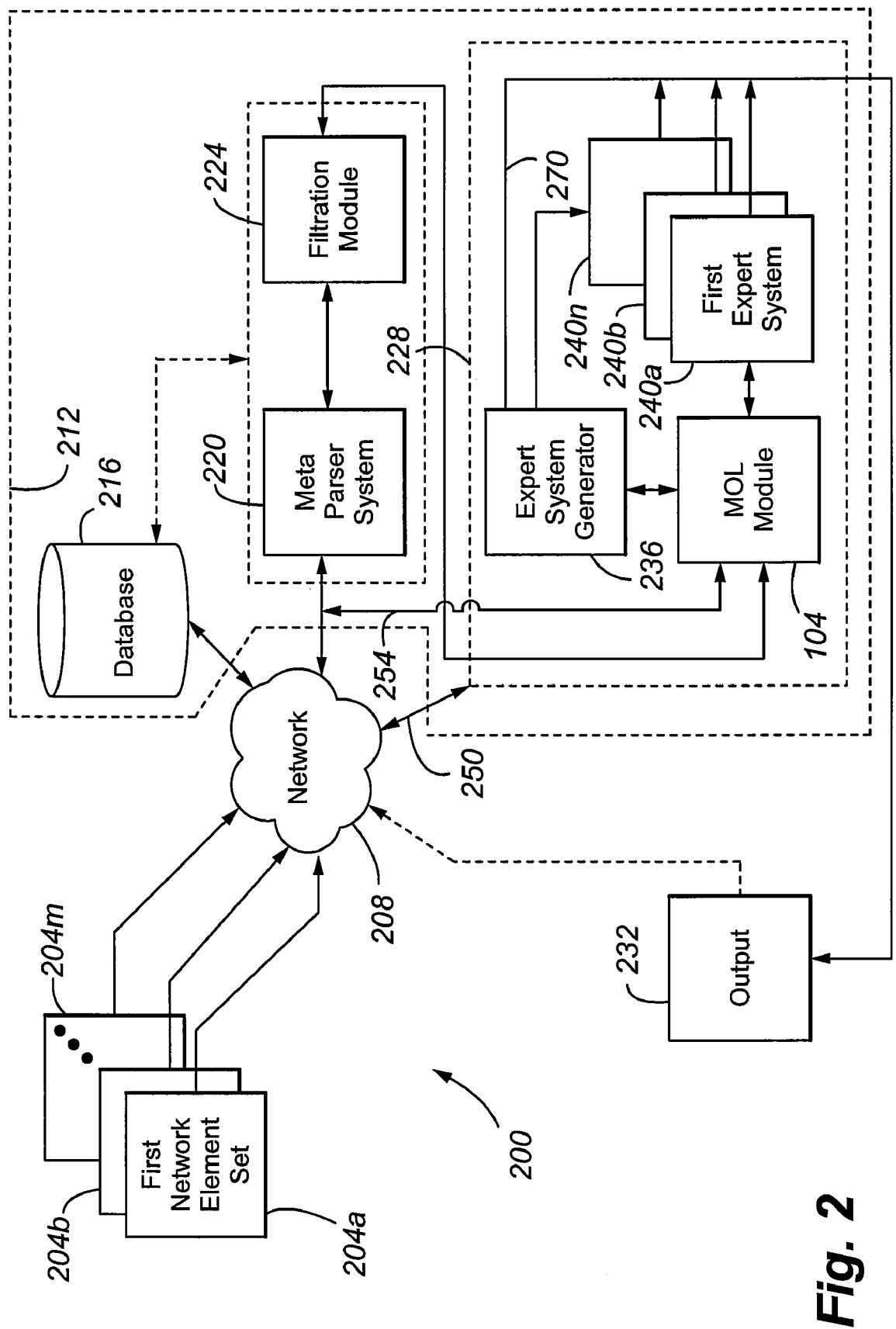
FIG. 2 is a block diagram of a behavioral analysis and identification system according to a second embodiment.

To further illustrate the underlying concepts of the present invention, a specific implementation of the system 100 will be discussed with reference to FIG. 2, which depicts a network architecture 200. The architecture includes first, second, . . . mth network element sets 204a-m interconnected by a network 208 with an event analysis and identification system 212.

The first, second, . . . mth network element sets 204a-m include groupings of network elements having a common characteristic. For instance, a selected set of elements 204a-m can correspond to a common enterprise, a common enterprise spatial location, a common type of network element, a common set of operations performed by the network elements, a common set of performance issues or problems, and the like. Examples of network elements include communication links, (media) servers, switches, softphones, hardphones, gateways, routers, firewalls, and the like.

The network 208 can be any distributed processing network, such as Wide Area Network (WAN) or Local Area Network (LAN). An example of a WAN is the Internet.

The event analysis and identification system 212 receives and analyzes event descriptive information 108 generated by the network elements in the first, second, . . . mth sets of network elements 204a-m and provides output 232. The system 212 includes a meta-system 202, database 216, and a behavioral analysis and identification system 228. The meta-system 202 includes a meta-parser system 220 and filtration module 224, and the system 228 includes the MOL module 104, an expert system generator 236, and first, second, . . . nth expert systems 240a-n.

The database 216 stores configuration and operational information respecting the network elements, customer records, and other information. The configuration and operational information, for instance, includes propositions respecting possible product alarms, states, configurations, operations, activities, states, types, identities, and functions.

Because it is often impractical to create an all-encompassing grammar to deal with all types of event descriptive information 108, the meta-parser system 220 includes a higher-level object and multiple parsers, with each parser corresponding to a selected grammar. The higher-level object receives the information 108, which can arbitrarily involve multiple grammars, and attempts to determine the structure to select the appropriate parser to convert the information 108 into a corresponding parsed expression, such as an abstract syntax tree. The abstract syntax tree expresses differing syntactical expressions in a common format. As will be appreciated, differing manufactures and types of components can have differing syntactical expressions of event descriptive information. Knowing the particular grammar employed, the higher level-object can provide this information to the MOL module 104 to assist the module in selecting an appropriate first, second, ... nth expert system 240a-n or in requesting the expert system generator 236 to create an appropriate first, second, ... nth expert system 240a-n. Typically, the higher level object performs a preliminary parse of only selected portions of the information 108. Output from the higher-level object includes the input stream, an indicator of whether the higher-level object was able to parse successfully the information 108, and, if so, an appropriate grammar or set of grammars to be considered by the parsers. In other implementations, the higher-level object provides a selected portion of the information 108 to multiple parsers and, based on the parsed output, determines which of the parsers is best suited to parse the remaining information 108. In some applications, the higher-level object can provide preliminary indications to the MOL module 104 of what grammar is likely involved, but also of what network element category or type may be involved. The meta-parser system 220 and its operation is further described in co-pending U.S. patent application Ser. No. 10/728,730, filed Dec. 4, 2003, entitled "A Dynamic System of Autonomous Parsers for Interpreting Arbitrary Telecommunication Equipment Streams", which is incorporated fully herein by this reference.

The filtration module 224 receives the parser system 220 output and filters out insignificant events and/or groups together related events for more efficient analysis by the system 228. Depending on the particular implementation, filtered events can be stored in database 216. As will be appreciated, the filtration module 224 can alternatively be located upstream of the meta-parser system 220 to reduce processing by the system 220. In one configuration, the filtration module 224 logs only selected types of event descriptive information in the database 216 along with service tickets associated with the information.

The MOL module 104 is described above and commonly implemented as at least second-order logic. It may be implemented as a higher-order logic, depending on the particular implementation. It has knowledge about the properties and capabilities of the various expert systems 240a-n and therefore acts as an expert over the expert systems 240a-n.

The first, second, ... nth expert systems 240a-n are a particular implementation of the first, second, ... LOL modules 112a-n and correspond to the first, second, ... mth sets of network elements 204a-m or subsets thereof. A subset may be wholly contained in a selected set of network elements 204a-n or span different sets of network elements 204a-n. Commonly, each expert system 240a-n corresponds to a particular rule set for analyzing event descriptive information 108 received from a particular type of network element. The network element may be a member of multiple network element sets.

The expert system generator 236 is an instantiation of the LOL module generator 120 and creates an expert system 240 to handle selected event descriptive information. The expert system 240 may be created dynamically in response to received event descriptive information 108 and/or created beforehand and invoked as corresponding event descriptive information 108 is received.

The output 232 is typically an identification of a particular network element fault, error, state, configuration, operation, and/or function or questions or comments respecting the expert system to be generated.

Figure 3:
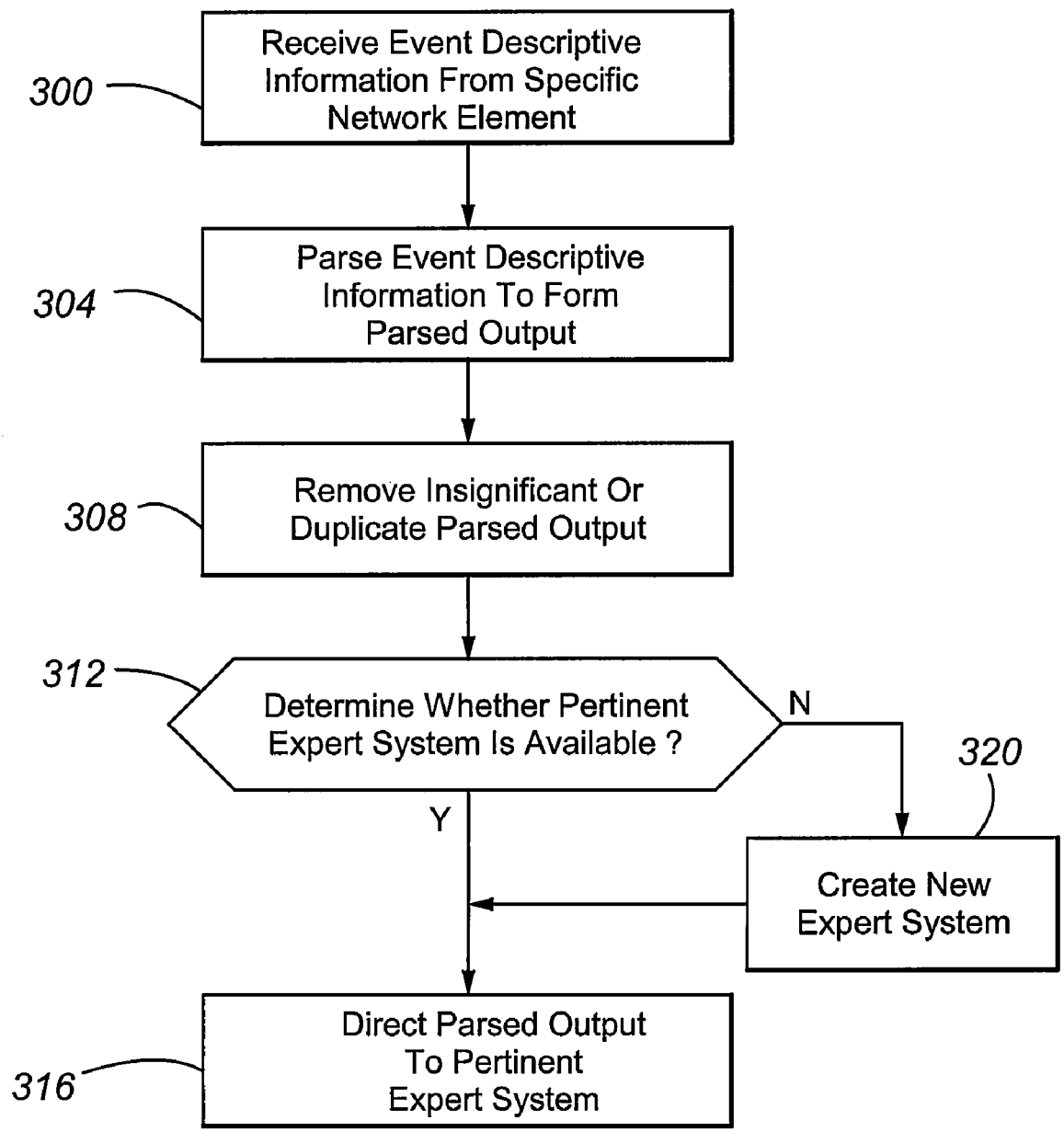
FIG. 3 is a flowchart according to a third embodiment.

The operation of the architecture 200 will now be described with reference to FIGS. 2 and 3.

In step 300, a network element, or agent in the network element, in one of first, second, ... mth network element sets 204a-m generates event descriptive information 108 respecting an event and forwards the information 108, via network 208, to the meta-parser system 220. The information 108 includes a description or identification of the network element or agent generating the information 108, a timestamp associated with generation of the information, a description or identification of the particular network element set of which the subject network element is a part, and information identifying an event or parameters indicative of the event. For example, if the network element is no longer operational or is offline, the alarm would include an indicator of this state and may, but typically does not, provide an indication of why the network element went offline.

In step 304, the event descriptive information 108 is parsed by the meta-parser system 220 to form parsed output, particularly an abstract syntax tree.

In step 308, the filtration module 224 removes parsed output deemed insignificant for purposes of further analysis. The filtration module 224 groups parsed output deemed to be related to a common event but received at different times or from different sources. The grouping can be done by incorporating into the parsed output an identifier of related parsed output previously forwarded to the system 228.

The filtered parsed output is provided to the MOL module 104 and, in decision diamond 312, the MOL module 104 determines whether a pertinent expert system 240a-n exists to analyze the output and, if so, selects the pertinent expert system 240a-n to further process the output. The selection may, for example, be based on preliminary analysis of the output by the MOL module 104 using an equivalent-order or higher-order rule set than the rule sets corresponding to the expert systems 240a-n. For example, the MOL module 104 can employ a second-order rule set when each of the expert systems 240a-n corresponds to a first-order rule set. The selection, alternatively, may be made by providing a selected portion of the parsed output, serially or in parallel, to multiple expert systems 240a-n. If only one expert system 240a-n is able to analyze the parsed output, that expert system 240a-n is selected. If no expert system 240a-n is able to analyze the parsed output, the MOL module 104 determines that no expert system is currently available to perform the desired analysis. If multiple expert systems 240a-n indicate an ability to analyze the parsed output, the MOL module 104 provides further parsed output to these expert systems to determine which provides the better analytical results. If the MOL module 104 is still unable to select a unique expert system to analyze the parsed output, an error message is provided to the human operator (not shown).

When the MOL module 104 determines that a particular expert system can process the parsed output, the MOL module 104, in step 316, forwards the parsed output to that expert system.

When the MOL module 104 determines that no expert system currently exists to process the parsed output, the MOL module 104, in step 320, invokes the expert system generator 236 to create a new expert system for the parsed output and, after creation of the expert system, provides the parsed output to the newly created expert system (step 316).

The depth of analysis performed by a selected expert system 240 depends on the order of logic employed by the system 240. First-order logic expert systems, for example, generally provide a shallower depth of analysis than second-order logic expert systems. In one configuration, the expert systems are first-order and provide their results to a diagnostic system, or to the MOL module itself, that diagnoses one or more causal events for the generation of the event descriptive information. For example, the diagnostic system or the MOL module, as appropriate, would determine why the reporting network element went offline and optionally provide recommendations to return the reporting element to online status. Alternatively, this information can be provided by the expert systems themselves.

In one configuration, the meta-parser system 220 and MOL module 104 can individually or collectively obtain further information from the reporting network element or other network elements in the respective set of network elements to assist analysis by the expert system. This is done, for example, by polling the various network elements according to known communication protocols. When the MOL module 104 collects the information via link 250, it may provide it to the meta-parser system 220 via link 254 for parsing prior to forwarding the collected information to a selected expert system.

The output 232 is an identification of a predetermined event associated with the selected event descriptive information and/or a set of recommendations and/or actions to be taken to remediate the identified event. For example, the output 232 can indicate an event described by the selected event descriptive information and/or a further event causing the generation of the event descriptive information. In the above example, the output 232 could provide the underlying fault or error condition for the reporting network element going offline and optionally recommendations to repair the underlying fault or error condition. The recommendations can be provided to an automated tool that is able to interact with the network element, reconfigure or reset it, and return it to online operation. The output 232 can also include a request to dispatch a service agent to repair the alarming network element.

Figure 4:
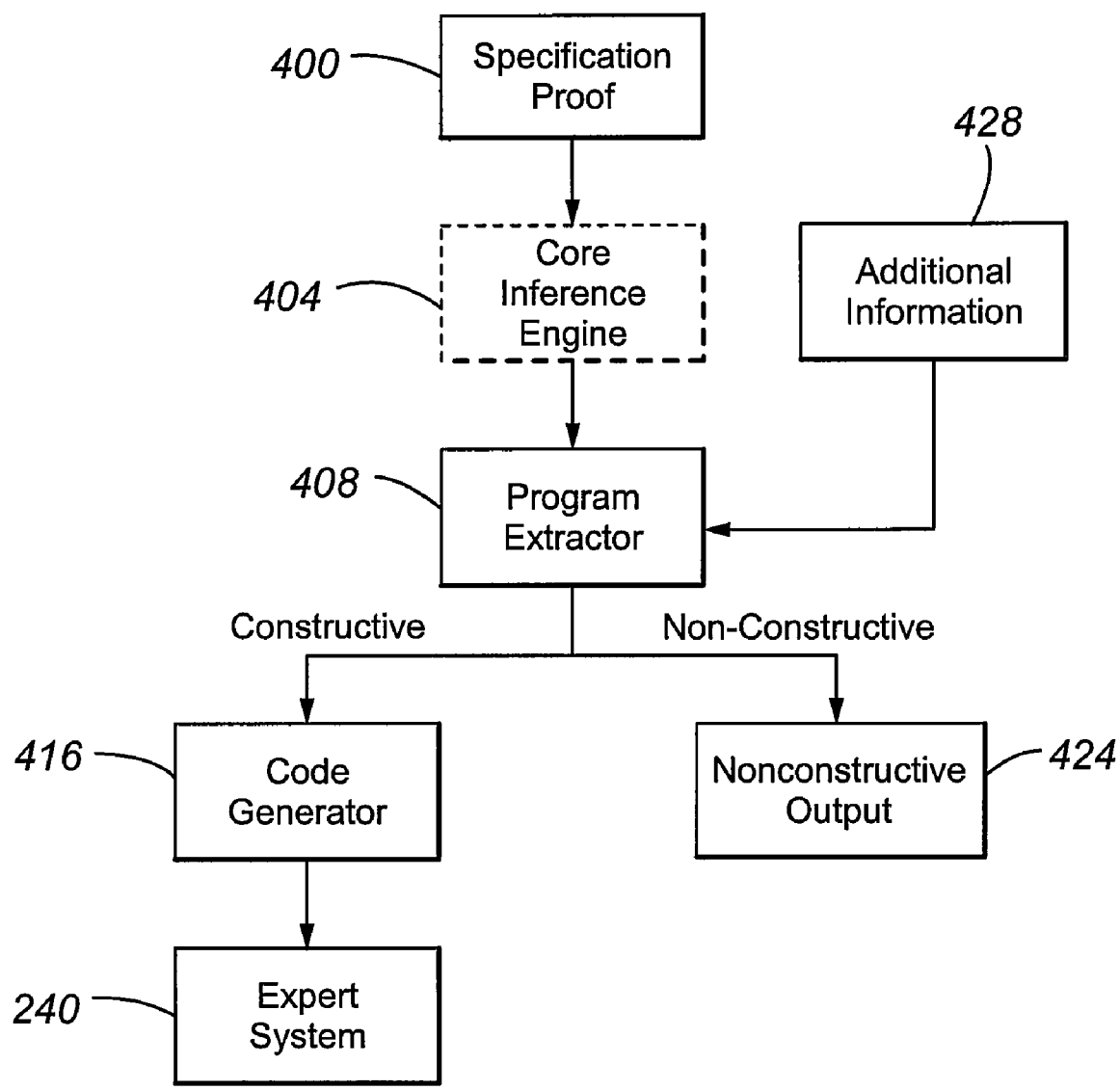
FIG. 4 is a block diagram depicting an expert system generator according to a fourth embodiment.

The process to create an expert system will now be described with reference to FIGS. 2 and 4. As discussed below, proof theory is used in generating expert systems from an expert system specification or specification proof. Rule sets, which correspond to an expert system, resemble the steps of a program. The steps of a program can be considered a proof. In isomorphism, the parameters of a function, such as a program, are considered axioms of the proof of a hypothesis. The hypothesis is the program specification (or specification proof).

The expert system generator 236 first retrieves specification proofs 400 from the database 216. Alternatively, the specification proof can be retrieved by the MOL module 104 and provided to the expert system generator 236. The specification proofs express meta-attributes or meta-properties of an automated entity whose behavior is being modeled. Specification proofs can be expressed as variables and associations and/or relationships among the variables. For example, the specification proof for voice messaging servers generally describes operations and/or components universally shared by voice messaging servers. The specification, for instance, would describe a state which can be up or on or down or off, a set of voice transformation operations (e.g., a transformation of voice energy to a digital equivalent), and the like. In one configuration, the specification proof is generated from propositions using techniques set forth in Stefan Berghofer's dissertation entitled *"Proofs, Programs and Executable Specifications in Higher Order Logic"*, Lehrstugl fur Software & Systems Engineering, Institut fur Informatik Technische Universitat Munchen (2003), which is incorporated herein by this reference. In this document, Berghofer teaches converting propositions denoted by φs into a specification proof using commands known as BALL/BEX (φ). These commands are an Isabelle implementation of "for all and there exists". Berghofer's approach is based on Isabelle higher-order logic for his number theoretic program extraction. Berghofer has proposed using ZF for number theoretic proofs but all of his work so far uses Isabelle higher-order logic on number theoretic proofs. In one configuration, the present invention uses ZF, and particularly the Isabelle's BALL/BEX commands, to generate the proof from a set of propositions or statements about, for instance, possible product alarms, states, configurations, and the like, and to extract expert systems.

The specification proof 400 is provided to an optional core inference engine 404, such as the Isabelle core inference engine, that executes statements in the proof and produces programmatic-type statements. Isabelle is further described in Institut fur Informatik TU Munchen, *Isabelle/HOL— Higher-Order Logic* (2005); *"Index of Isabelle/HOL"* (October 2005), available at http://isabelle.in.tum.de/library/HOL/index.html; Nipkow, et al., *"Isabelle/HOL: A Proof Assistant for Higher-Order"*, published by Springer (2002); and a presentation by Berghofer entitled *"Program Extraction in Isabelle"* Institut fur Informatik TU Munchen available at http://www4.in.tum.de/~berghofe/papers/TYPES2002_slides.pdf, each of which is incorporated herein by this reference. In the Berghofer presentation, higher-order logic is used to generate a proof from a specification proof. In one configuration, the output of the core inference engine is a series of higher-order logic rule sets or statements derived from the specification proof. In one configuration, the output is a set of Isabelle statements. The Isabelle language is further described in the *Isabelle/HOL—Higher Order Logic* reference cited above. As will be appreciated, the output can be expressed as statements in some other higher-order logic language, such as Haskell, Miranda, ML, Cyclone, HiLog, XProlog, and Nemerle.

The output of the core inference engine 404 is provided to a program extractor 408 (or proof generator), which converts the output into a suitable programming language, such as the ML language, that defines the steps, operations, functions, and/or rules (which is the equivalent of the proof of the specification proof) to be applied by an expert system. The program extractor 408 provides a systematic way to build programs that have correct construction. Stated another way, the program extractor extracts a constructive proof of the specification proof. A constructive proof can be viewed as a program plus the correctness of the proof. The program extractor 408 can be, for example, Isabelle ZF (which is a programming language that uses ZF set theory) and Isabelle higher-order logic.

The output of the program extractor can be of two types, namely, constructive and non-constructive. When operated in the constructive proof mode, the program extractor 408 produces a constructive proof. When operated in the non-constructive proof mode, the program extractor 408 produces statements and/or questions about the proof but does not generate the proof itself. Statements about the proof include, for instance, whether the proof exists or can be generated. Questions include, for instance, queries about the specification proof and program extractor. The type of output may be selected by the human operator or by the expert system generator in the event that it encounters errors or other problems in generating the expert system 240.

Constructive output is provided to a code generator 416, which converts the output to a source code of a set of programs or functions in a desired language, such as the ML language, JRules, OPSJ, Isabelle, and the like. The code generator output corresponds to the rule set applied by the expert system 240.

Non-constructive output 424 is provided to a human administrator, such as via a graphical user interface. Non-constructive output is shown by link 270 or to the MOL module 104. To generate the non-constructive output 424, additional information 428 may be provided by a human operator and/or MOL module 104 to the program extractor

408. Such added input includes, for example, information regarding current product alarms, states, and configurations that instantiate the propositions.

The exemplary systems and methods of this invention have been described in relation to behavioral analysis and identification systems. However, to avoid unnecessarily obscuring the present invention, the preceding description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a mainframe computer, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, router, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

For example in one alternative embodiment, the LOL module generator 120 is implemented in a language other than Isabelle but Isabelle is used to generate the implementation language.

In another alternative embodiment, the MOL module 104 does not use lower level modules for supplemental analysis but analyzes the information 108 itself. A problem with this embodiment is that higher-order logic modules may operate less efficiently or fail to terminate within a reasonable time due to the complexity of the analysis.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   a processor executing a program extractor and a code generator;
   providing a specification proof describing at least one of (i) a state and/or configuration and (ii) a condition, operation, and/or function of a network element;
   converting, by the program extractor, at least one of the specification proof and a modified form thereof of the specification proof into a first program language; and
   converting, by the code generator, the first program language into a second program language, the second program language describing an expert system adapted to analyze event descriptive information, wherein the program extractor performs the converting step in a first operating mode, and wherein the program extractor is operable, in a second operating mode, to provide non-constructive output, the non-constructive output being at least one of questions and statements about the conversion of the at least one of the specification proof and the modified form of the specification proof into the first program language in response to a failure by the program extractor to perform the converting step in the first operating mode.

2. The method of claim 1, wherein the specification proof is derived, by set theory, from a set of propositions, the set of propositions describing at least one of a set of network element states, conditions, operations, configurations, functions, and alarms.

3. The method of claim 1, wherein, prior to conversion by the program extractor, the specification proof is converted by a core inference engine into a set of higher-order logic statements, wherein the set of higher-order logic statements is the modified form of the specification proof, and wherein the modified form of the specification is converted by the program extractor.

4. A computer readable medium comprising processor-executable instructions adapted to perform the steps of claim 1.

5. A system, comprising:
   an input for a specification proof describing at least one of (i) a state and/or configuration and (ii) a condition, operation, and/or function, of a network element;
   a program extractor adapted to convert in a first operating mode at least one of the specification proof and a modified form of the specification proof into a first program language, wherein in a second operating mode the program extractor is adapted to provide non-constructive output, the non-constructive output being at least one of questions and statements about the conversion of the specification proof and a modified form of the specification proof; and
   a code generator adapted to convert the first program language into a second program language, the second program language describing an expert system adapted to analyze event descriptive information.

6. The system of claim 5, wherein the specification proof is derived, by set theory, from a set of propositions, the set of propositions describing at least one of a set of network element states, conditions, operations, configurations, functions, and alarms.

7. The system of claim 5, wherein, prior to conversion by the program extractor, the specification proof is converted by a core inference engine into a set of higher-order logic statements, wherein the set of higher-order logic statements is the modified form of the specification proof, and wherein the modified form of the specification is converted by the program extractor.

8. The system of claim 5, wherein the second operating mode is selected in response to a failure by the program extractor to generate programming language describing an expert system.

9. The system of claim 8, wherein the program extractor fails to generate the second programming language describing an expert system, wherein the program extractor provides non-constructive output, and wherein the non-constructive output is generated at least in part in response to additional information provided by at least one of a human operator and a many-order logic (MOL) module to the program extractor.

10. The system of claim 9, wherein the additional information is provided by a human operator.

11. The system of claim 9, wherein the additional information is provided by an MOL module.

12. The method of claim 1, wherein in the second operating mode the non-constructive output is generated at least in part in response to additional information provided by at least one of a human operator and a many-order logic (MOL) module to the program extractor.

13. The method of claim 12, wherein the additional information is provided by a human operator.

14. The method of claim 1, wherein the additional information is provided by an MOL module.

* * * * *

UNITED STATES PATENT AND TRADEMARK OFFICE
CERTIFICATE OF CORRECTION

PATENT NO. : 8,219,512 B2  
APPLICATION NO. : 13/212946  
DATED : July 10, 2012  
INVENTOR(S) : Daniel J. Daily et al.

Page 1 of 1

It is certified that error appears in the above-identified patent and that said Letters Patent is hereby corrected as shown below:

At Column 17, line 41, please delete the word "thereof".

Signed and Sealed this  
Fifth Day of February, 2013

Teresa Stanek Rea  
*Acting Director of the United States Patent and Trademark Office*